(12) United States Patent
Branca et al.

(10) Patent No.: US 8,327,191 B2
(45) Date of Patent: Dec. 4, 2012

(54) AUTOMATICALLY POPULATING SYMPTOM DATABASES FOR SOFTWARE APPLICATIONS

(75) Inventors: Salvatore Branca, Rome (IT); Angela Molinari, Rome (IT); Edoardo Turano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 12/244,256

(22) Filed: Oct. 2, 2008

(65) Prior Publication Data

US 2009/0106597 A1 Apr. 23, 2009

(30) Foreign Application Priority Data

Oct. 19, 2007 (EP) ..................................... 07118882

(51) Int. Cl.
*G06F 11/00* (2006.01)
(52) U.S. Cl. ........................... 714/38.1; 717/135; 703/22
(58) Field of Classification Search ................... 714/38, 714/26, 38.1, 41
See application file for complete search history.

(56) References Cited

U.S. PATENT DOCUMENTS

| | | | |
|---|---|---|---|
| 4,696,003 A | 9/1987 | Kerr et al. | |
| 6,012,152 A * | 1/2000 | Douik et al. | 714/26 |
| 6,144,954 A * | 11/2000 | Li | 706/62 |
| 6,175,946 B1 | 1/2001 | Ly et al. | |
| 6,223,337 B1 | 4/2001 | Blume | |
| 6,609,229 B1 | 8/2003 | Ly et al. | |
| 6,615,167 B1 | 9/2003 | Devins et al. | |
| 6,687,834 B1 | 2/2004 | Morales, Jr. et al. | |
| 6,874,135 B2 | 3/2005 | Gupta et al. | |
| 6,885,983 B1 | 4/2005 | Ho et al. | |
| 6,898,735 B2 | 5/2005 | Tuttle | |
| 6,959,433 B1 | 10/2005 | Morales, Jr. et al. | |
| 7,007,249 B2 | 2/2006 | Ly et al. | |
| 7,152,942 B2 | 12/2006 | Walmsley et al. | |
| 7,333,962 B2 * | 2/2008 | Zen | 706/15 |
| 2002/0199027 A1 * | 12/2002 | Huber | 709/310 |
| 2003/0204784 A1 * | 10/2003 | Jorapur | 714/38 |
| 2003/0226062 A1 * | 12/2003 | Gender et al. | 714/38 |
| 2005/0015675 A1 | 1/2005 | Kolawa et al. | |
| 2005/0043919 A1 * | 2/2005 | Kennedy et al. | 702/182 |
| 2005/0114838 A1 | 5/2005 | Stobie et al. | |

(Continued)

FOREIGN PATENT DOCUMENTS

EP 0 240 663 A2 10/1987

(Continued)

*Primary Examiner* — Yolanda L Wilson
(74) *Attorney, Agent, or Firm* — Francis L. Ammes; Stephen J. Walder, Jr.; Jeffrey S. LaBaw

(57) ABSTRACT

A solution is proposed for populating a symptom collection—such as a symptom database—for a software application. The symptom collection includes an indication of a set of symptoms; each symptom consists of an undesired behavior of the software application, which symptom is due to each one of a set of corresponding problems of the software application (resulting from a misuse thereof). The symptom database also includes an indication of an explanation of each problem. A corresponding method involves performing a test of the software application for verifying a correctness of the software application. The symptom collection is then populated according to a result of the test.

24 Claims, 6 Drawing Sheets

U.S. PATENT DOCUMENTS

| | | |
|---|---|---|
| 2005/0188275 A1 | 8/2005 | Maly et al. |
| 2006/0085132 A1 | 4/2006 | Sharma et al. |
| 2006/0085687 A1 | 4/2006 | Cheng |
| 2007/0006041 A1* | 1/2007 | Brunswig et al. ............... 714/38 |
| 2007/0162894 A1 | 7/2007 | Noller et al. |
| 2007/0174713 A1 | 7/2007 | Rossi et al. |
| 2007/0233633 A1* | 10/2007 | Keith, Jr. ......................... 706/60 |
| 2008/0147583 A1* | 6/2008 | Ashcraft et al. ................ 706/46 |

FOREIGN PATENT DOCUMENTS

| | | |
|---|---|---|
| EP | 0240996 A3 | 10/1987 |
| EP | 0240663 B1 | 5/1994 |
| JP | 07-036688 | 2/1995 |
| JP | 2000-112784 | 4/2000 |
| WO | WO 2004/086068 A1 | 10/2004 |
| WO | WO 2007/081979 A2 | 7/2007 |

* cited by examiner

AUTOMATICALLY POPULATING SYMPTOM DATABASES FOR SOFTWARE APPLICATIONS

TECHNICAL FIELD

The present invention relates to the data processing field. More specifically, the present invention relates to the population of symptom collections for software applications.

BACKGROUND

The use of software applications (either by system-users controlling their management or by end-users exploiting their services) is not always a simple task. Indeed, the software applications are often so complex that it is very difficult to use them correctly in every situation. This is especially true in modern data processing systems, wherein a myriad of different software applications interact among them; the problem is further exacerbated in multi-tier environments, such as with distributed architectures, heterogeneous structures, and the like.

As a result, problems may occur during the execution of each software application because of its misuse by a (generic) user—for example, caused by a configuration error. Each problem manifests itself to the user as an undesired behavior of the software application (typically, with the return of an error message).

When this happens, the user tries to remove the undesired behavior so as to recover the correct operation of the software application. However, this recovery process is very difficult. Indeed, the user should at first trace the undesired behavior to the cause of the corresponding problem; this is quite complex, since the same undesired behavior may often be due to different problems. It is then necessary to understand how to correct the problem, so as to eliminate the undesired behavior of the software application.

Some tools aimed at facilitating the above-mentioned recovery process are available.

Particularly, the software application is almost always provided with manuals that may be consulted by the user. The manuals typically end with a problem-solution section. This section lists the known undesired behaviors of the software application (referred to as symptoms); for each symptom, there is indicated the possible causes, together with their suggested corrections.

As a further improvement, it has also been proposed to associate a symptom database with the software application; as above, the symptom database provides a list of the known symptoms of the software application with their causes and corrections. The information in the symptom database is arranged in a predefined format, so as to facilitate its use; moreover, this allows exploiting different service tools that can access the symptom database during the recovery process. For example, the "IBM Support Assistant (ISA)" is a commercial plug-in for every software application, which plug-in provides a standard interface to the corresponding symptom database.

The population of the symptom database requires logging any possible undesired behavior of the software application with all its causes and corrections. This is a substantial manual process, which is mainly based on an investigation process requiring a heavy human intervention; as a consequence, the process is tedious, time consuming and error prone.

The process of populating the symptom database is then often left as the last one in the development of the software application. Therefore, it is not uncommon to have software applications that are released with a very poor or even empty symptom database—which is then populated over time as undesired behaviors of the software application are reported by the users.

However, all of the above has a detrimental impact on the usability of the software application.

BRIEF SUMMARY

The illustrative embodiments provide for populating a symptom collection for a software application including an indication of a set of symptoms, each one consisting of an undesired behavior of the software application being due to each one of a set of corresponding problems of the software application resulting from a misuse of the software application, and an indication of an explanation of each problem. The illustrative embodiments perform a test of the software application for verifying a correctness of the software application. The illustrative embodiments populate the symptom collection according to a result of the test.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

BRIEF DESCRIPTION OF THE SEVERAL VIEWS OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
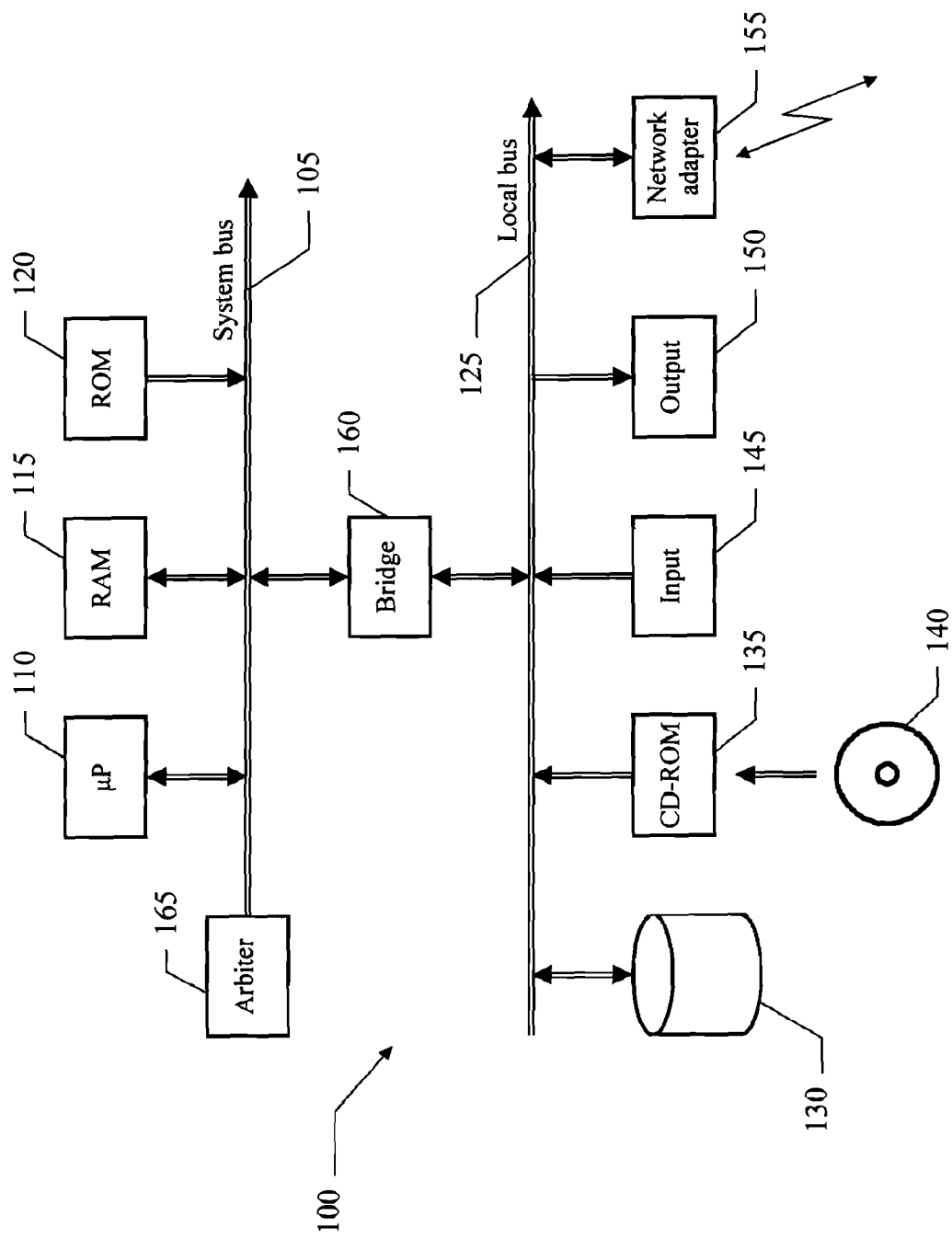
FIG. 1 illustrates a schematic block diagram of a computer that can be used to practice the solution according to an embodiment of the invention.

With reference in particular to FIG. 1, a schematic block diagram of a computer 100 (for example, a PC) is illustrated. The computer 100 is formed by several units that are connected in parallel to a system bus 105. In detail, one or more microprocessors (μP) 110 control operation of the computer 100; a RAM 115 is directly used as a working memory by the microprocessors 110, and a ROM 120 stores basic code for a bootstrap of the computer 100. Several peripheral units are clustered around a local bus 125 (by means of respective interfaces). Particularly, a mass memory consists of one or more hard-disks 130 and drives 135 for reading CD-ROMs 140. Moreover, the computer 100 includes input units 145 (for example, a keyboard and a mouse), and output units 150 (for example, a monitor and a printer). An adapter 155 is used to connect the computer 100 to a network (not shown in the figure). A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

The computer 100 is used to populate a symptom database of a new software application to be released. The symptom database includes a list of symptoms, each one consisting of an undesired behavior of the software application; typical examples of symptoms are the software application that does not start, returns an error message, performs an unexpected operation, closes, and the like. For each symptom, there is indicated an explanation of every problem (resulting from a misuse of the software application) that might manifest itself through the symptom. Particularly, the explanation of the problem includes its cause and a suggested correction. Typical examples of these causes are errors in the installation of the software application, in its configuration, in the invocation of its commands, and the like; therefore, it is possible to suggest how to correct the installation or the configuration of the software application, or how to invoke its commands correctly, and the like.

In the solution according to an embodiment of the invention, as described in detail in the following, the population of the symptom database is performed during a test process of the software application.

In other words, the computer 100 is mainly used to test the software application during its development. The test process is aimed at verifying the correctness of the software application (i.e., that the software application behaves as expected); however, the same test process provides additional information as a byproduct, which information may be used to populate the symptom database of the software application.

The proposed solution automates (at least in part) the process of populating the symptom database; as a result, the process is easier, faster and more reliable.

This allows having the symptom database substantially complete already when the software application is released (being understood that the symptom database may always be incremented over time as further undesired behaviors of the software application are reported by its users).

All of the above has a beneficial impact on the usability of the software application.

Moreover, the test process is generally designed (for its own nature) to verify most of the features of the software application; as a result, the obtained symptom database has a very high coverage.

The proposed solution then fosters the release of autonomic software applications, which can provide self-healing capabilities (through the information stored in the symptom database so obtained).

Figure 2:
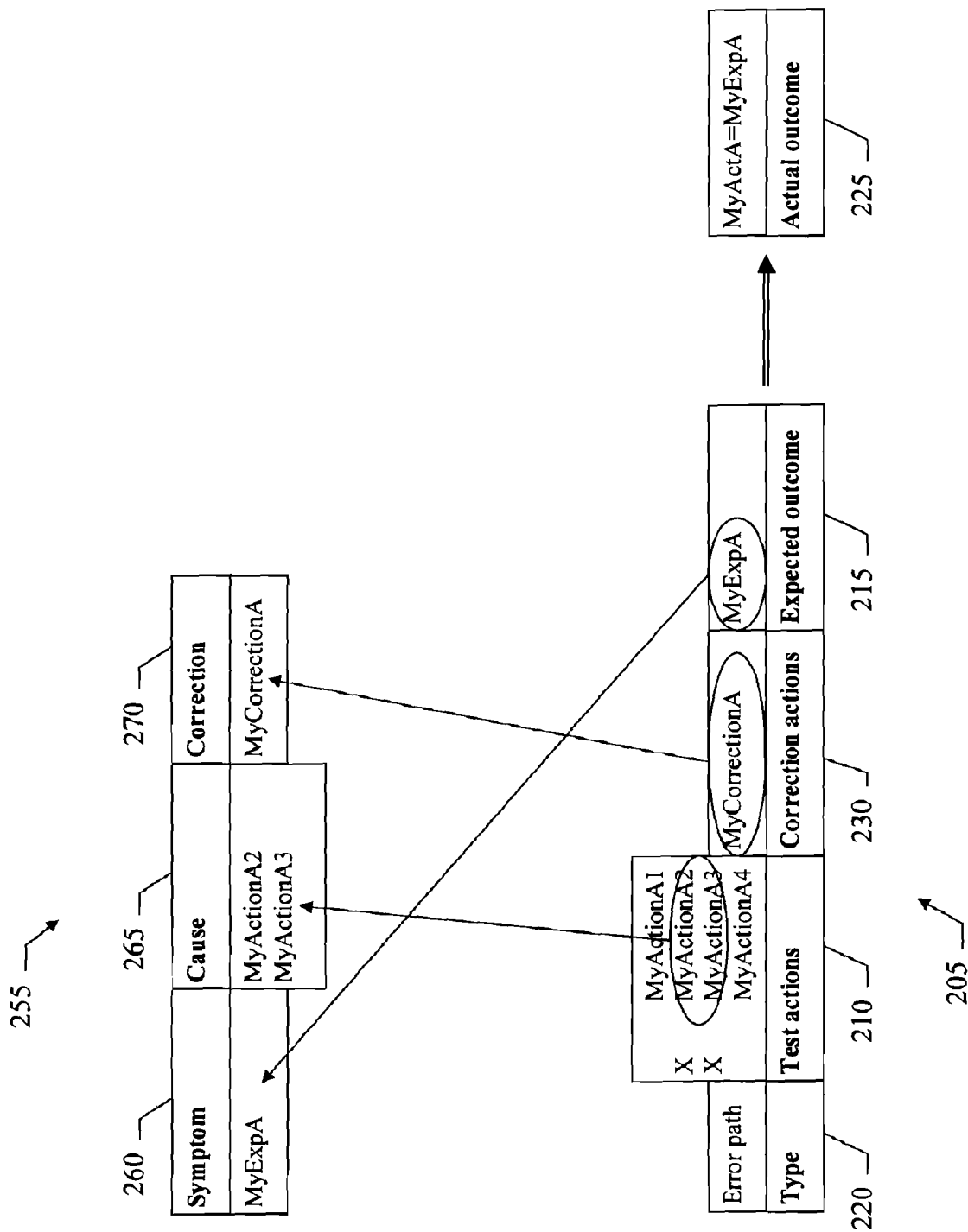
FIGS. 2-3 illustrate examples of applications of the solution according to different embodiments of the invention.

An example of application of the solution according to an embodiment of the invention is illustrated in FIG. 2.

Generally, the definition of the test process includes a series of test cases 205 (only one shown in the figure). Each test case 205 is in turn defined by one or more test actions 210 ("MyActionA1", "MyActionA2", "MyActionA3" and "MyActionA4" in the example at issue). The test actions 210 are associated with an expected outcome 215 of their execution, which is deemed to be correct according to the desired behavior of the software application ("MyExpA" in the example at issue); the expected outcome 215 may consist of either an (individual) outcome that is expected after the execution of each test action 210 (or a group thereof) or a (global) outcome that is expected after the execution of all the test actions 210. The test case 205 also includes an indication of its type 220. For this purpose, the test cases are classified according to whether they exercise a "Happy path" or an "Error path" of the software application. The test cases of the "Happy path" type are used to verify the correctness of the software application in allowable scenarios (i.e., when the software application is used correctly); for example, this means testing the software application when it is properly installed and configured, and it is invoked with the right commands. On the contrary, the test cases of the "Error path" type (as the one in the example at issue) are instead used to verify the correctness of the software application in non-allowable scenarios (i.e., when the software application is misused); for example, this means testing the software application when it is installed in an improper way, it is configured wrongly, or it is invoked with unacceptable commands.

The execution of the test case 205 starts performing the corresponding test actions 210. An actual outcome 225 of the test case 205, consisting of a response of the software application to these test actions ("MyActA" in the example at issue), it is then determined and compared with the expected outcome 215; as above, the actual outcome 225 may consist of either an (individual) outcome of each test action 210 or a (global) outcome of all the test actions 210. The test case 205 is set as passed when the actual outcome 225 matches the expected outcome 215—i.e., when all the individual outcomes or the global outcome are the same; otherwise, when the actual outcome 225 differs from the expected outcome 215, the test case 205 is set as failed.

Each test case of the "Error path" type that passed (as the test case 205 at issue) provides useful information for populating the symptom database. Indeed, this test case 205 verified that when a problem is purposely induced in the software application (by means of the test actions 210), the software application correctly provides the actual outcome 225 that is expected. Therefore, the explanation of a problem may be derived from the test actions 210, and a symptom with which the problem manifests itself may be derived from the actual outcome 225 (or the equal expected outcome 215).

For this purpose, in each test case of the "Error path" type (such as the test case 205 at issue) one or more of the test actions 210 that actually cause the problem to be verified are identified (as indicated by a cross in the figure for the test actions "MyActionA2" and "MyActionA3"); these (problem) test actions 210 then directly define the cause of the problem (while the other test actions 210 are not relevant in this respect). This operation is performed when the test case is defined (for example, by distinguishing the test actions that cause the problem from the ones that are simply used to setup the test environment). Moreover, one or more correction actions that can be used to correct the problem ("MyCorrectionA" in the example at issue) are determined and added to the test case 205; particularly, the correction actions 230 may be determined automatically by simply reversing the problem test actions (i.e., "NOT MyActionA2" and "NOT MyActionA3" in the example at issue).

Therefore, it is possible to determine a new entry 255 for the symptom database. The entry 255 includes a symptom 260, which is set to the expected outcome 215 ("MyExpA"). The entry 255 also includes a cause 265 of the symptom 260, which is set to the problem test actions 210 ("MyActionA2"

and "MyActionA3"). Moreover, the cause 265 is associated with a correction 270, which is set to the correction actions 230 ("MyCorrectionA").

In this way, the desired information may be obtained completely automatically (once the test cases have been properly defined).

Figure 3:
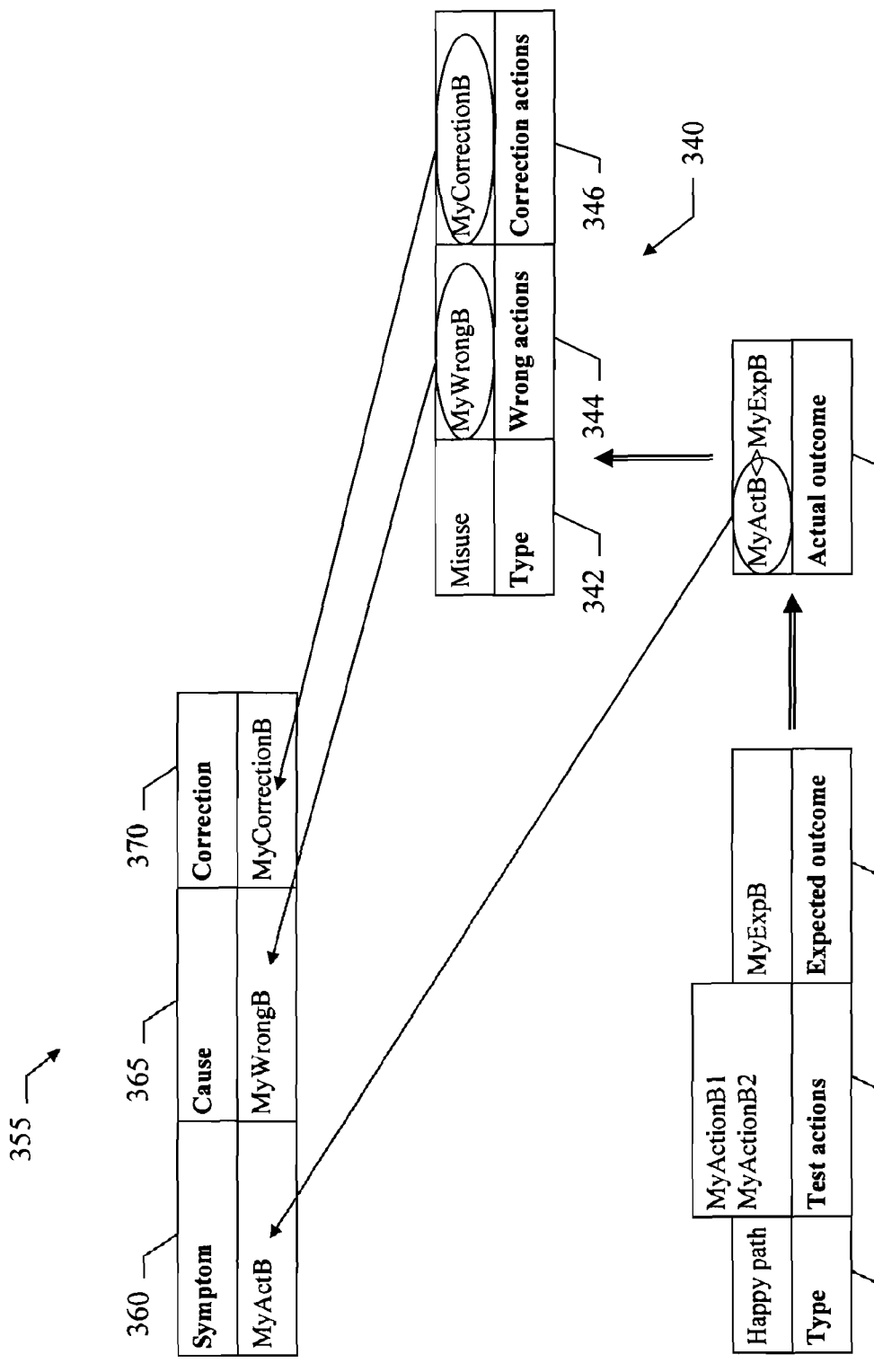

Moving now to FIG. 3, another test case 305 is illustrated. As above, the test case 305 includes one or more test actions 310 ("MyActionB1" and "MyActionB2" in the example at issue), an expected outcome 315 ("MyExpB" in the example at issue), and a type 320 ("Happy path" in the example at issue). The execution of the test case 305 provides an actual outcome 325 ("MyActB" in the example at issue). However, the test case 305 now failed, since the actual outcome 325 differs from the expected outcome 315.

Each test case—irrespectively of its type—that failed (as the test case 305 at issue) may provide useful information for populating the symptom database. Indeed, in this case a defect is opened with a development team of the software application, which defect is represented with a corresponding record 340 in the figure. The development team analyses the defect 340 in order to determine what error caused the defect 340; particularly, the defect may be due to a code flaw of the software application or to a misuse thereof (i.e., a wrong definition of the test actions and/or their execution environment). A type 342 of the defect 340 is set accordingly (to "Misuse" in the example at issue). When the defect 340 is of the "Misuse" type (as in the case at issue), the development team also adds an indication of one or more wrong actions 344 that caused the defect 340 ("MyWrongB" in the example at issue); these wrong actions 340 may be included in the same test actions 310 and/or in other configuration actions. Moreover, one or more correction actions that can be used to correct the defect 340 ("MyCorrectionB" in the example at issue) are determined and added to the defect 340; particularly, in this case as well the correction actions 346 may be determined automatically by simply reversing the wrong actions 344 (i.e., "NOT MyWrongB" in the example at issue).

Each test case that failed because of a defect of the "Misuse" type (as the test case 305 at issue) provides useful information for populating the symptom database. Indeed, the analysis of the failure of this test case 305 determined that a problem (manifesting itself with the actual outcome 325) occurs when the wrong actions 344 are performed (which problem can be corrected with the correction actions 346).

Therefore, it is possible to determine a new entry 355 for the symptom database. The entry 355 includes a symptom 360, which is set to the actual outcome 315 ("MyActB"). The entry 355 also includes a cause 365 of the symptom 360; the cause 365 is set to the wrong actions 344 of the defect 340 ("MyCauseB"). Moreover, the cause 365 is associated with a correction 370, which is set to the correction actions 346 of the same defect 340 ("MyCorrectionB").

In this way, it is possible to preserve information that otherwise would be lost (once the defect has been corrected).

For example, let us assume that the software application under test is a web application ("MyApplication") that accesses a corresponding database. A run of the its test process is aimed at verifying a startup of the software application; for this purpose, the following test cases TC001-TC004 are defined:

Test case TC001: "Happy path"
Test action 1—Install "MyApplication"
Test action 2—Start the server of "MyApplication"
Test action 3—Open a browser to the login servlet of "MyApplication"
Expected outcome:
Expected outcome 1—"MyApplication" is correctly installed
Expected outcome 2—The server of "MyApplication" correctly starts
Expected outcome 3—The login servlet of "MyApplication" is correctly displayed in the browser
Test case TC002: "Error path"
Test action 1 (problem test action)—Install "MyApplication" providing wrong credentials for connection to the database Test action 2—Start the server of "MyApplication"
Expected outcome:
Expected outcome 1—"MyApplication" is correctly installed
Expected outcome 2—The server of "MyApplication" cannot start because of security reasons; message "CODIFnnnnE The connection to the database could not be initialized" is displayed
Test case TC003: "Happy path"
Test action 1—Install "MyApplication" and its database on two separate systems
Test action 2—Start the server of "MyApplication"
Test action 3—Open a browser to the login servlet of "MyApplication"
Expected outcome:
Expected outcome 1—"MyApplication" is correctly installed
Expected outcome 2—The server of "MyApplication" correctly starts
Expected outcome 2—The login servlet of "MyApplication" is correctly displayed in the browser
Test case TC004: "Happy path"
Test action 1—Install "MyApplication" and its database on a machine of another vendor
Test action 2—Start the server of "MyApplication"
Test action 3—Open a browser to the login servlet of "MyApplication"
Expected outcome:
Expected outcome 1—"MyApplication" is correctly installed
Expected outcome 2—The server of "MyApplication" correctly starts
Expected outcome 3—The login servlet of "MyApplication" is correctly displayed in the browser
The execution of the test cases TC001-TC004 provides the following results:
Test case 0001: passed
Test case 0002: passed
Test case TC003: failed
Actual outcome after the test action 2—Message "CODIFnnnnE. The connection to the database could not be initialized" is displayed
Test case TC004: failed
Actual outcome after the test action 2—Message "CODIFnnnnE The connection to the database could not be initialized" is displayed
Therefore, two defects are opened for the failed test cases TC003 and TC004 (denoted with D003 and D004, respectively). The result of the analysis of the defects D003 and D004 by the development team is the following:
Defect D003: "Misuse"
Wrong action 1—Database manager of the system where the database is installed was not started
Defect D004: "Code" error
In this case, the test case TC001 (test case of the "Happy path" type that passed) and the case TC004 (test case that failed because of a defect of the "Code" type) are discarded since they do not provide any useful information for the population of the symptom database. The test case TC002 (test case of the "Error path" type that passed) and the test case TC003 (test case that failed because of a defect of the "Misuse" type) are instead selected for this purpose. Particularly, the selected test cases TC002 and TC003 determine the following new symptoms with the corresponding explanations (denoted with SE002 and SE003, respectively):

SE002

Symptom: message "CODIFnnnnE The connection to the database could not be initialized" is displayed Explanation: "MyApplication" installed providing wrong credentials for connection to the database

SE003

Symptom: message "CODIFnnnnE The connection to the database could not be initialized" is displayed Explanation: Database manager of the system where the database is installed was not started Since both records refer to the same symptom, it is possible to add a new entry to the symptom database (or to update a preexisting entry for the same symptom) with a link to the two different possible explanations of the symptom:

Symptom: message "CODIFnnnnE The connection to the database could not be initialized" is displayed Explanation A: "MyApplication" installed providing wrong credentials for connection to the database Explanation B: Database manager of the system where the database is installed was not started It is emphasized that the use of the result of the test process for populating the symptom database clearly differs from its log as commonly applied for documentation purposes (for example, as described in EP-A-0240663). Indeed, the log of the test process is aimed at providing information about the defects of the software application (to be fixed by the development team); for this purpose, the logged information relates to the failed test cases indiscriminately. Conversely, the symptom database is aimed at providing information about problems caused by a misuse of the software application (which nevertheless behaves correctly); therefore, in this case the information being relevant for its population only relates to specific test cases (such as selected according to the criteria proposed in the above-described embodiment of the invention).

Figure 4:
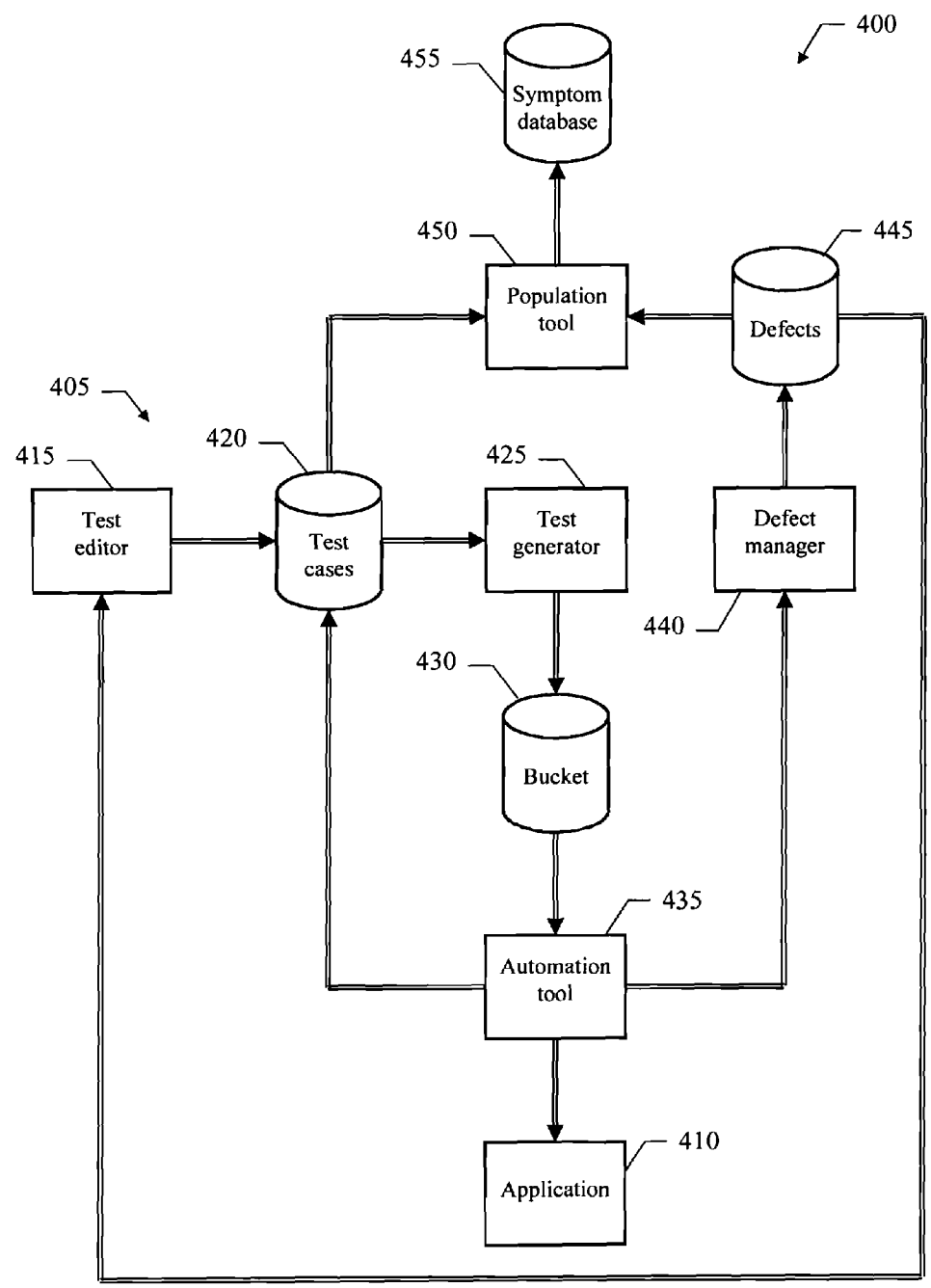
FIG. 4 illustrates the main software components that can be used to implement the solution according to an embodiment of the invention.

Considering now FIG. 4, the main software components that can be used to implement the solution according to an embodiment of the invention are denoted as a whole with the reference 400. The information (programs and data) is typically stored on the hard-disk and loaded (at least partially) into the working memory of each computer when the programs are running, together with an operating system and other application programs (not shown in the figure). The programs are initially installed onto the hard disk, for example, from CD-ROM.

Particularly, a test suite 405 implements the test process of a generic software application 410. The test suite 405 includes a test editor 415, which is used to define the desired test cases. All the test cases available to verify the correctness of the software application 410 (typically organized into sets, each one for a different component of the software application 410) are stored into a corresponding repository 420.

A test generator 425 accesses the test cases repository 420. The test generator 425 creates an execution bucket for each run of the test process (for example, relating to each component of the software application 410 during a complete test or relating to a subset thereof during a regression test); the bucket specifies the operations to be performed for running the desired test cases in a machine-readable language (such as XML-based). The bucket so obtained is saved into a corresponding file 430.

An automation tool 435 (for example, consisting of the STAF/STAX—formed by the STAX execution engine running on top of the STAF framework) controls the execution of each bucket read from the file 430 on the software application 410. The result of the test process (i.e., whether each test case passed or failed) is saved by the automation tool 435 into the test case repository 420. For each test case that failed, the automation tool 435 opens a corresponding defect with a defect manager 440. The defect manager 440 controls a corresponding database 445, which stores an indication of each defect with the result of its analysis by the development team. The defect database 445 is accessed by the test editor 415, which accordingly updates the test cases in the repository 420.

In the solution according to an embodiment of the present invention, a population tool 450 is provided. The population tool 450 interfaces with the test suite 405, and particularly it accesses the test cases database 420 and the defect database 445. As described above, the population tool 450 populates a symptom database 455 (according to the result of the test process). The symptom database 455 so obtained can then be associated with the software application 410 once it is ready to be released (at the end of the test process).

Figure 5A:
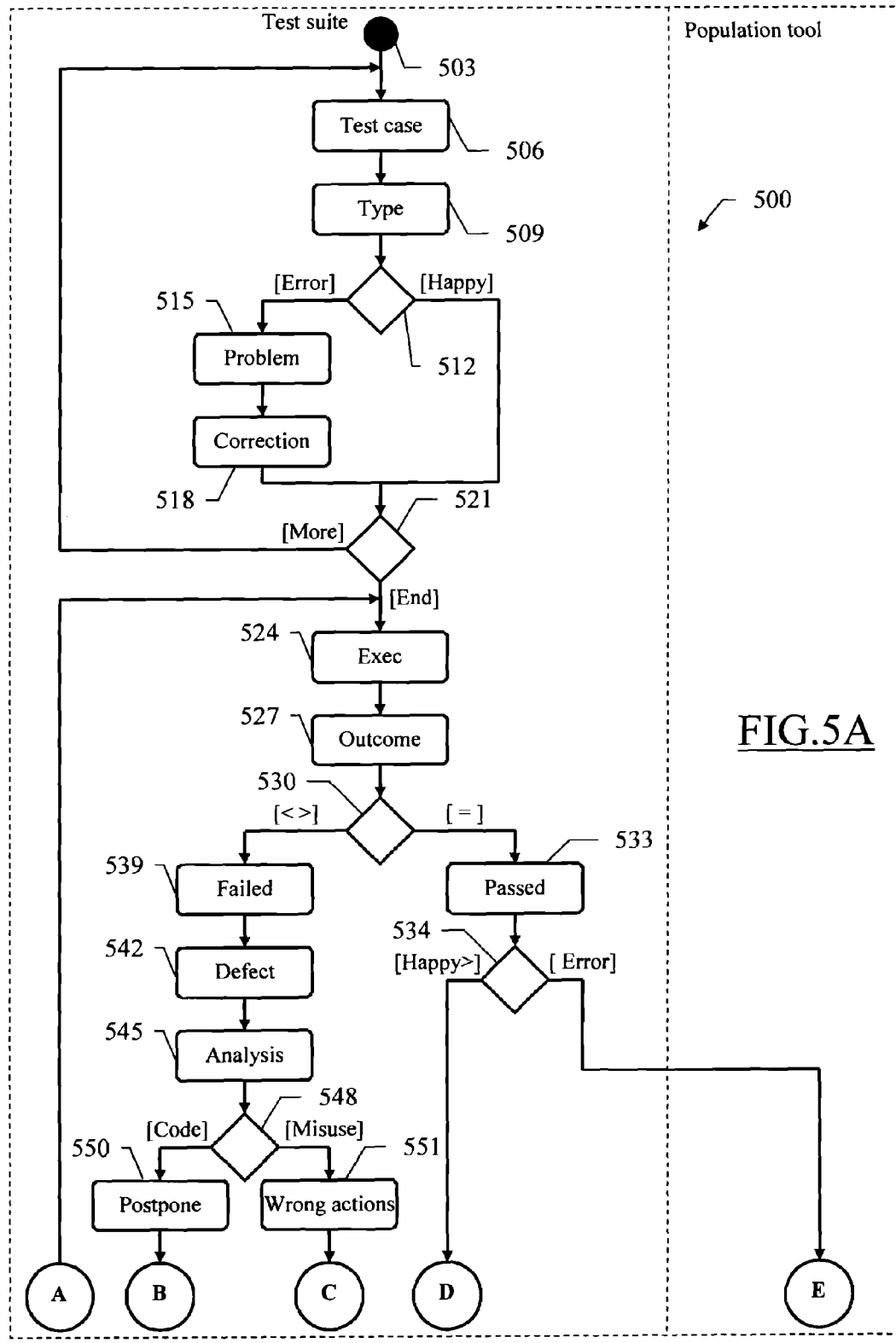
FIGS. 5A-5B show a diagram describing the flow of activities relating to an implementation of the solution according to an embodiment of the invention.
Figure 5B:
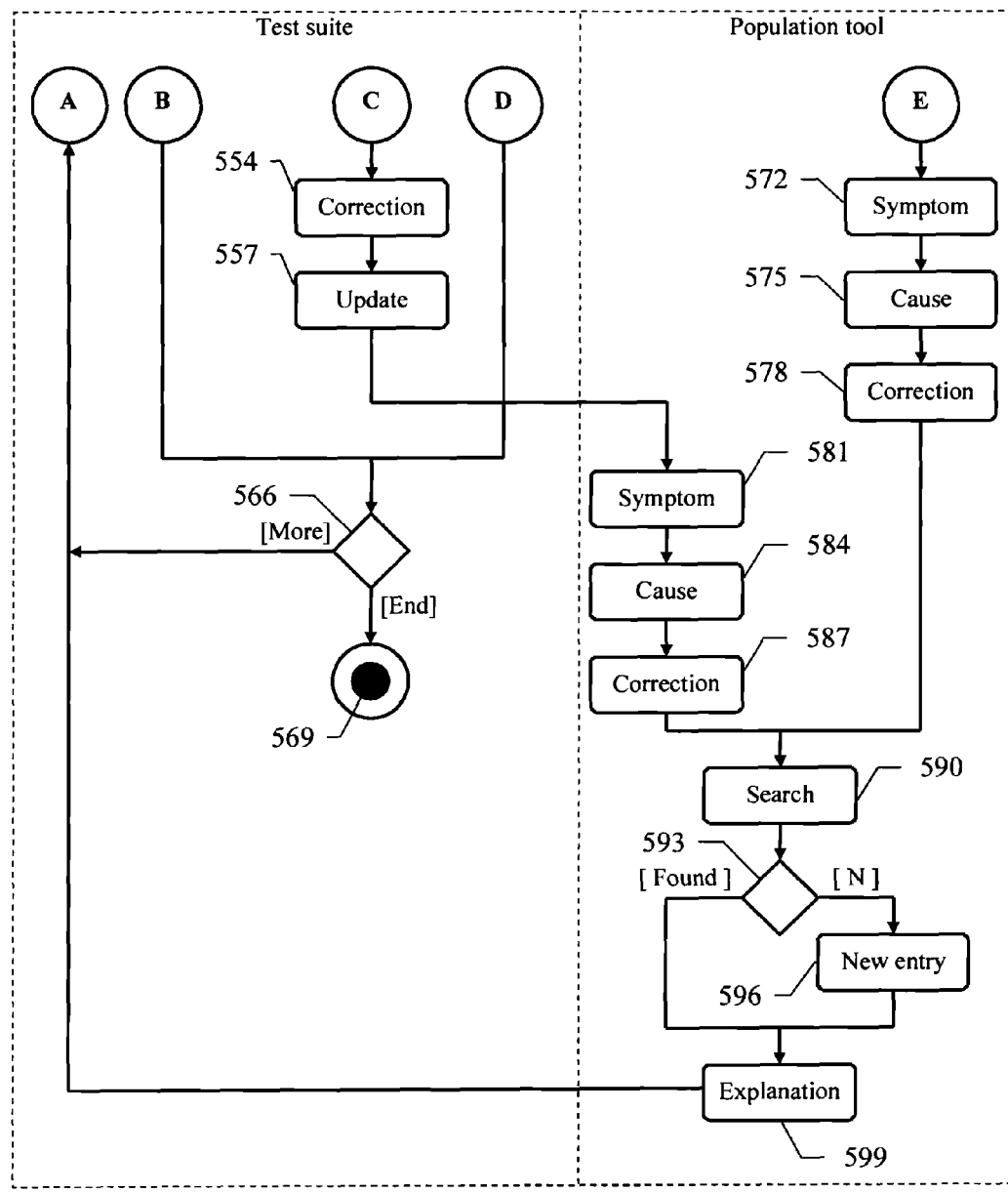

Moving to FIGS. 5A-5B, the logic flow of an exemplary process that can be implemented in the above-described system to populate the symptom database is represented with a method 500.

The method begins at the black start circle 503 in the swim-lane of the test suite. A loop is then performed to define a test process (either to create a new one or to update a preexisting one). For this purpose, at block 506 a test case is defined with its test actions and expected outcome. Continuing to block 509, the test case is classified on the basis of its type—i.e., "Happy path" or "Error path"—and flagged accordingly. The flow of activity then branches at block 512. If the test case is of the "Error path" type, its problem test actions are identified and flagged at block 515. Passing to block 518, the corresponding correction actions are determined (for example, by reversing the problem test actions) and added to the test case. The method then descends into block 521; the same point is also reached from block 512 directly when the test case is of the "Happy path" type. A test is now made at block 521 to verify whether further test cases are to be defined. If so, the method returns to block 506 to repeat the same operations described above.

Conversely, when the definition of the test process has been completed, the flow of activity passes to block 524. As soon as an execution bucket is selected for a run of the test process, a further loop is performed for each test case of the bucket (starting from the first one); particularly a (current) test case is executed by performing the corresponding test actions. The actual outcome of the test case (consisting of the response of the software application to these test actions) is determined at block 527. The flow of activity then branches at block 530 according to a result of the comparison between the actual outcome of the test case and its expected outcome. The blocks 533-536 are executed if the two outcomes match, whereas the blocks 539-563 are executed otherwise; in both cases, the method then merges at block 566.

With reference now to block 533 (matching outcomes), the test case is set as passed (for example, by flagging it accordingly). The type of the test case is then verified at block 534. If the test case is of the "Happy path" type, the method directly descends into block 566. Conversely, the flow of activity moves to the swim-lane of the population tool (as described in the following).

Considering instead block 539 (not matching outcomes), the test case is set as failed at block 539. A corresponding defect is then opened at block 542 (by creating a corresponding new record into the defect database). The development team of the software application analyses the defect at block 454 to determine what error caused it; for example, formal problem solving techniques may be used—such as based on the Root Cause Analysis (RCA) method. As a result, the defect is classified as of the "Code" or "Misuse" type and flagged accordingly. The flow of activity then branches at block 548. If the defect is of the "Code" type, the test case is put into a hold state at block 550 (so as to postpone its execution until the error in the code of the software application is solved by the development team); the method then descends into block 566. Conversely, when the defect is of the "Misuse" type, the wrong actions that caused the defect are added to the defect at block 551. Passing to block 554, the corresponding correction actions are determined (for example, by reversing the wrong actions) and added to the defect. The flow of activity then moves to the swim-lane of the population tool (as described in the following).

With reference now to block 566, a test is made to determine whether further test cases are still to be executed. If so, the process returns to block 524 to reiterate the same operations described above. Conversely, the method ends at the concentric white/block stop circles 569.

Moving to the swim-lane of the population tool, the block 572 is entered from block 534 when a test case of the "Error path" type passed; in response thereto, a new symptom is set to the actual outcome of this test case. Proceeding to block 575, a new cause for the new symptom is set to the problem test actions of the test case. Moreover, a new correction for this new cause is set to the correction actions of the test case at block 578.

Likewise, the block 581 is entered from block 557 after a test case failed because of a defect of the "Misuse" type; in response thereto, a new symptom is set to the actual outcome of this test case. Proceeding to block 584, a new cause for the new symptom is set to the wrong actions of the corresponding defect. Moreover, a new correction for this new cause is set to the correction actions of the same defect at block 587.

In any case, the method continues to block 590 (either from block 578 or from block 587). In this phase, the new symptom is searched in the symptom database. The flow of activity then branches at block 593 according to the result of the search. If the new symptom is not found, a new corresponding entry is added to the symptom database at block 596; the method then descends into block 599. The same point is also reached directly from block 593 when the new symptom is already present in the symptom database. With reference now to block 599, the new cause and the new correction (i.e., the new explanation) are linked to the entry of the new symptom. The method then returns to block 524.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

Similar considerations apply if the symptom database is replaced with a file, a distributed structure, or any equivalent collection including an indication of the symptoms with a link to the explanations of the problems that may cause them. Moreover, the symptom database may be populated in any other way according to the result of the test process; for example, although in the preceding description reference has been made to an incremental procedure that is performed concurrently with the execution of the test process, the same result may also be obtained with a batch procedure that is performed after the test process has been completed. In any case, the information to be inserted into the symptom database may be derived from the result of the test case in any other way (even involving some sort of conversion of the corresponding formats).

Any other schema of the symptom database is contemplated. For example, each entry may include a symptom and the corresponding explanation, each explanation may include only the cause or only the correction of the corresponding problem, and the like.

The proposed solution lends itself to be implemented with different test processes for whatever software application—for example, including any number of test cases or more generally involving the execution of equivalent operations; for example, the test process may be executed on Command Line Interfaces (CLIs), on Graphical User Interfaces (GUIs), on distributed software applications, and so on. Each bucket may also be generated in a different language for use by any other automation tool; anyway, nothing prevents running the test in a manual way. Moreover, it is possible to determine the outcome of each test case with more complex rules; for example, the expected outcome may consist of a range of values (with the test case that is deemed passed when the actual outcome is included in this range).

The type ("Happy path" or "Error path") of the test cases may be indicated in any equivalent way (for example, with a separate list).

In any case, the explanation of the symptom corresponding to any test case of the "Error path" that passed may be determined with equivalent techniques, even based on all its test actions indistinctly.

Moreover, nothing prevents defining the correction of each problem in a different way (for example, with a text in prose that is entered manually).

Similar considerations apply to the population of the symptom database according to the test cases that failed because of defects of the "Misuse" type.

In any case, in a simplified implementation of the invention it is not excluded the possibility of taking into account only the test cases of the "Error path" type that passed for the population of the symptom database.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented with a hardware structure (for example, integrated in a chip of semiconductor material), or with a combination of software and hardware. It would be readily apparent that it is also possible to deploy the same solution as a service that is accessed through a network (such as in the Internet).

The proposed method may be carried out on a system having a different architecture or including equivalent units (for example, based on a local network). Moreover, each computer may include similar elements (such as cache memories temporarily storing the programs or parts thereof to reduce the accesses to the mass memory during execution); in any case, it is possible to replace the computer with any code execution entity (such as a PDA, a mobile phone, and the like), or with a combination thereof (such as a multi-tier server architecture, a grid computing infrastructure, and the like).

The invention claimed is:

1. A method, in a data processing system, for populating a symptom collection for a software application, the method comprises:
    performing a test of the software application for verifying a correctness of the software application, wherein:
        the test includes a plurality of test cases,
        a subset of error test cases in the plurality of test cases verifies the correctness of the software application in non-allowable scenarios, wherein the non-allowable scenarios are scenarios indicative of end-user misuse,
        execution of an error test case in the subset of error test cases purposely induces a problem in the software application, and
        responsive to an expected outcome in response to executing the error test case, identifying a symptom indicative of an undesired behavior and a test action of the error test case that caused the problem; and
    populating the symptom collection according to a result of the error test case with the symptom and the test action that caused the problem.

2. The method of claim 1, wherein the symptom collection further includes a correction of the problem.

3. The method of claim 1, wherein performing the test of the software application for verifying the correctness of the software application comprises:
    defining the plurality of test cases each one including a set of test actions and the expected outcome,
    executing the test actions of each test case,
    detecting an actual outcome of the test actions of each test case, and
    setting each test case as passed or failed according to a comparison between the corresponding actual outcome and the expected outcome,
    and wherein populating the symptom collection comprises:
    determining a new symptom according to the actual outcome of each one of a set of selected test cases.

4. The method of claim 3, wherein defining the plurality of test cases comprises:
    flagging at least one test case as an error test case, each error test case being intended to verify the correctness of the software application with the problem, and wherein populating the symptom collection comprises:
    selecting each passed error test case for the population of the symptom collection, and
    determining a new explanation of the new symptom for each passed error test case according to the test actions of the passed error test case.

5. The method of claim 4, wherein defining the plurality of test cases comprises:
    flagging at least one test action of each error test case inducing the corresponding problem as a problem test action,
    and wherein determining the new explanation of the new symptom for each passed error test case comprises:
    setting the new explanation according to the at least one problem test action of the passed error test case.

6. The method of claim 5, wherein defining the plurality of test cases comprises:
    specifying at least one correction action for correcting the problem being induced by the at least one problem test action of each error test case,
    and wherein determining the new explanation of the new symptom for each passed error test case comprises:
    setting a new cause to an indication of the at least one problem test action of the passed error test case, and
    setting a new correction to an indication of the at least one correction action of the passed error test case.

7. The method of claim 3, wherein performing the test of the software application for verifying the correctness of the software application comprises:
    flagging each failed test case as wrong when the failure is due to a misuse of the software application, and
    determining at least one wrong action causing a corresponding problem of each wrong failed test case,
    and wherein populating the symptom collection comprises:
    selecting each wrong failed test case for the population of the symptom collection, and
    determining a new explanation of the new symptom for each wrong failed test case according to the at least one wrong action.

8. The method of claim 7, wherein performing the test of the software application for verifying the correctness of the software application comprises:
    specifying at least one correction action for correcting the problem resulting from the at least one wrong action of each wrong failed test case,
    and wherein determining the new explanation of the new symptom for each wrong failed test case comprises:
    setting a new cause to an indication of the at least one wrong action of the wrong failed test case, and
    setting a new correction to an indication of the at least one correction action of the wrong failed test case.

9. The method of claim 1, wherein the scenarios indicative of end-user misuse is at least one of a software application being installed in an improper way, the software application being configured wrongly, or he software application being invoked with unacceptable commands.

10. A computer program product for performing a method for populating a symptom collection for a software application comprising a non-transitory computer-usable medium embodying a computer readable program, wherein the computer readable program, when executed on a computing device, causes the computing device to:
perform a test of the software application for verifying a correctness of the software application, wherein:
the test includes a plurality of test cases,
a subset of error test cases in the plurality of test cases verifies the correctness of the software application in non-allowable scenarios, wherein the non-allowable scenarios are scenarios indicative of end-user misuse,
execution of an error test case in the subset of error test cases purposely induces a problem in the software application, and
responsive to an expected outcome in response to executing the error test case, identifying a symptom indicative of an undesired behavior and a test action of the error test case that caused the problem; and
populate the symptom collection according to a result of the error test case with the symptom and the test action that caused the problem.

11. The computer program product of claim 10, wherein the symptom collection further includes a correction of the problem.

12. The computer program product of claim 10, wherein the computer readable program to perform the test of the software application for verifying the correctness of the software application further causes the computing device to:
define the plurality of test cases each one including a set of test actions and the expected outcome,
execute the test actions of each test case,
detect an actual outcome of the test actions of each test case, and
set each test case as passed or failed according to a comparison between the corresponding actual outcome and the expected outcome,
and wherein the computer readable program to populate the symptom collection further causes the computing device to:
determine a new symptom according to the actual outcome of each one of a set of selected test cases.

13. The computer program product of claim 12, wherein the computer readable program to define the plurality of test cases further causes the computing device to:
flag at least one test case as an error test case, each error test case being intended to verify the correctness of the software application with the problem,
and wherein the computer readable program to populate the symptom collection further causes the computing device to:
select each passed error test case for the population of the symptom collection, and
determine a new explanation of the new symptom for each passed error test case according to the test actions of the passed error test case.

14. The computer program product of claim 13, wherein the computer readable program to define the plurality of test cases further causes the computing device to:
flag at least one test action of each error test case inducing the corresponding problem as a problem test action,
and wherein the computer readable program to determining the new explanation of the new symptom for each passed error test case further causes the computing device to:
set the new explanation according to the at least one problem test action of the passed error test case.

15. The computer program product of claim 14, wherein the computer readable program to define the plurality of test cases further causes the computing device to:
specify at least one correction action for correcting the problem being induced by the at least one problem test action of each error test case,
and wherein the computer readable program to determine the new explanation of the new symptom for each passed error test case further causes the computing device to:
set a new cause to an indication of the at least one problem test action of the passed error test case, and
set a new correction to an indication of the at least one correction action of the passed error test case.

16. The computer program product of claim 12, wherein the computer readable program to perform the test of the software application for verifying the correctness of the software application further causes the computing device to:
flag each failed test case as wrong when the failure is due to a misuse of the software application, and
determine at least one wrong action causing a corresponding problem of each wrong failed test case,
and wherein the computer readable program to populate the symptom collection further causes the computing device to:
select each wrong failed test case for the population of the symptom collection, and
determine a new explanation of the new symptom for each wrong failed test case according to the at least one wrong action.

17. The computer program product of claim 16, wherein the computer readable program to perform the test of the software application for verifying the correctness of the software application further causes the computing device to:
specify at least one correction action for correcting the problem resulting from the at least one wrong action of each wrong failed test case,
and wherein the computer readable program to determine the new explanation of the new symptom for each wrong failed test case further causes the computing device to:
set a new cause to an indication of the at least one wrong action of the wrong failed test case, and
set a new correction to an indication of the at least one correction action of the wrong failed test case.

18. The computer program product of claim 10, wherein the scenarios indicative of end-user misuse is at least one of a software application being installed in an improper way, the software application being configured wrongly, or he software application being invoked with unacceptable commands.

19. A system for populating a symptom collection for a software application, comprising:
a processor; and
a memory coupled to the processor, wherein the memory comprises a computer program which configures the processor to:
perform a test of the software application for verifying a correctness of the software application, wherein:
the test includes a plurality of test cases,
a subset of error test cases in the plurality of test cases verifies the correctness of the software application in non-allowable scenarios, wherein the non-allowable scenarios are scenarios indicative of end-user misuse, execution of an error test case in the subset of error test cases purposely induces a problem in the software application, and responsive to an expected outcome in response to executing the error test case, identifying a symptom indicative of an undesired behavior and a test action of the error test case that caused the problem; and populate the symptom collection according to a result of the error test case with the symptom and the test action that caused the problem.

20. The system of claim 19, wherein the symptom collection further includes a correction of the problem.

21. The system of claim 19, wherein the instructions to perform the test of the software application for verifying the correctness of the software application further causes the processor to:

define the plurality of test cases each one including a set of test actions and the expected outcome, execute the test actions of each test case, detect an actual outcome of the test actions of each test case, and set each test case as passed or failed according to a comparison between the corresponding actual outcome and the expected outcome, and wherein the instructions to populate the symptom collection further causes the processor to:

determine a new symptom according to the actual outcome of each one of a set of selected test cases.

22. The system of claim 19, wherein the scenarios indicative of end-user misuse is at least one of a software application being installed in an improper way, the software application being configured wrongly, or he software application being invoked with unacceptable commands.

23. A tool in a memory for populating a symptom collection for a software application, wherein the tool includes:

means for populating the symptom collection according to a result of a subset of error test cases with a symptom and a test action that caused a problem to occur in the software application being performed for a test for verifying a correctness of the software application, wherein:

the test includes a plurality of test cases, the subset of error test cases in the plurality of test cases verifies the correctness of the software application in non-allowable scenarios, wherein the non-allowable scenarios are scenarios indicative of end-user misuse, execution of an error test case in the subset of error test cases purposely induces the problem in the software application, and responsive to an expected outcome in response to executing the error test case, identifying the symptom indicative of an undesired behavior and the test action of the test case that caused the problem.

24. The tool of claim 23, wherein the scenarios indicative of end-user misuse is at least one of a software application being installed in an improper way, the software application being configured wrongly, or he software application being invoked with unacceptable commands.

* * * * *